(12) United States Patent
Jardine et al.

(10) Patent No.: US 11,021,547 B2
(45) Date of Patent: Jun. 1, 2021

(54) METHOD OF SYNTHESISING 6-DEOXY-6-AMINO-β-D-GLUCOPYRANOSIDE-CONTAINING POLYMERS AND THEIR PRECURSORS

(71) Applicant: University of Cape Town, Cape Town (ZA)

(72) Inventors: Moegamat Anwar Jardine, Cape Town (ZA); Shakeela Sayed, Cape Town (ZA)

(73) Assignee: University of Cape Town, Cape Town (ZA)

( * ) Notice: Subject to any disclaimer, the term of this patent is extended or adjusted under 35 U.S.C. 154(b) by 0 days.

(21) Appl. No.: 16/765,427

(22) PCT Filed: Nov. 21, 2018

(86) PCT No.: PCT/IB2018/059169
§ 371 (c)(1),
(2) Date: May 19, 2020

(87) PCT Pub. No.: WO2019/102367
PCT Pub. Date: May 31, 2019

(65) Prior Publication Data
US 2020/0325250 A1    Oct. 15, 2020

(30) Foreign Application Priority Data

Nov. 21, 2017  (GB) .................................. 1719330

(51) Int. Cl.
*C08B 37/00*  (2006.01)
*C08B 15/06*  (2006.01)
*C08B 37/16*  (2006.01)

(52) U.S. Cl.
CPC .......... *C08B 37/0024* (2013.01); *C08B 15/06* (2013.01); *C08B 37/0012* (2013.01)

(58) Field of Classification Search
CPC .. C08B 15/06; C08B 37/0024; C08B 37/0012
See application file for complete search history.

(56) References Cited

U.S. PATENT DOCUMENTS

2011/0003980 A1* 1/2011 Wada ..................... C07H 15/18
                                                                       536/16.8

FOREIGN PATENT DOCUMENTS

| CN | 102127172 A | 7/2011 |
|----|-------------|--------|
| CN | 102174125 A | 9/2011 |
| CN | 102827307 A | 12/2012 |
| CN | 102863554 A | 1/2013 |
| CN | 103897121 A | 7/2014 |
| CN | 104857003 A | 8/2015 |
| JP | 52138581 A | 11/1977 |
| WO | WO 2009/136601 A1 | 11/2009 |
| WO | WO 2011/083360 A1 | 7/2011 |

OTHER PUBLICATIONS

Cumpstey, "Chemical Modification of Polysaccharides", Hindawi Publishing Corporation ISRN Organic Chemistry, Jun. 9, 2013 (Jun. 9, 2013), pp. 1-27.
Satoh, et al.,"6-Amino-6-deoxy-chitosan. Sequential chemical modifications at the C-6 positions of N-phthaloyl-chitosan and evaluation as a gene carrier", Carbohydrate Research, Pergamon, GB, vol. 341, No. 14, Oct. 16, 2006 (Oct. 16, 2006), pp. 2406-2413.

\* cited by examiner

*Primary Examiner* — Jonathan S Lau
(74) *Attorney, Agent, or Firm* — Foley & Lardner LLP

(57) ABSTRACT

The invention provides an improved method of synthesising derivatives of β-D-glucopyranoside-containing polymers, such as chitin, chitosan, cellulose, amylose, pullulan, curdlan, inulin, guar gum or cyclodextrin. The method includes reacting a polymer of formula (III) with a cyclic imide to form a polymer of formula (I) thereby introducing a nitrogen functionality at the 6-position and providing access to 6-deoxy-6-amino-β-D-glucopyranoside-containing polymers.

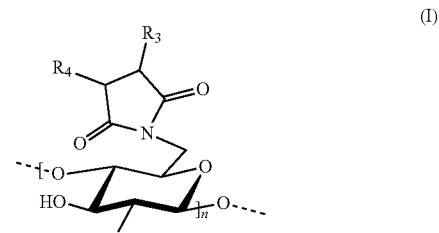

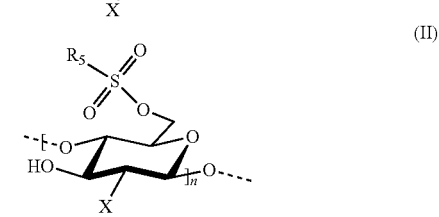

14 Claims, 1 Drawing Sheet

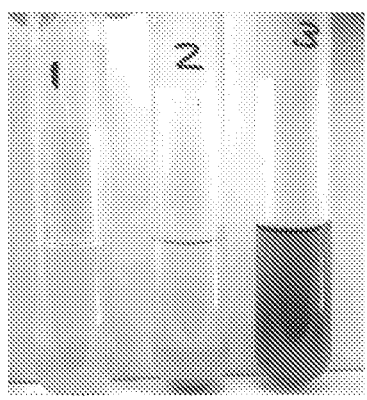 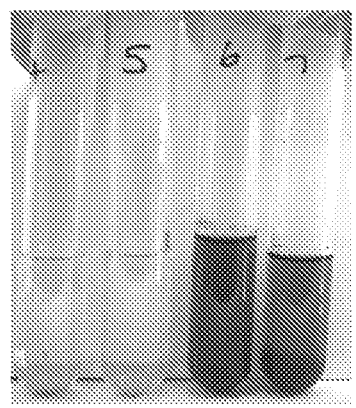

Synthesis of 6-deoxy-6-amino chitin:
Reaction with ninhydrin solution to gave;
1. 6-deoxy-6-p-tosyl chitin (-);
2. 6-deoxy-6-N-phthaloyl chitin (-);
3. 6-deoxy-6-amino chitin (+)

Synthesis of 6-deoxy-6-amino chitosan:
Reaction with ninhydrin solution to gave;
4. 6-deoxy-6-p-tosyl 2-N-Phthaloyl chitosan (-);
5. 6-deoxy-2,6-N-diphthaloyl chitosan (-);
6. 6-deoxy-6-amino chitosan (+).
Phthaloyl deprotection conditions- EtOH/$NH_2NH_2$
7. 6-deoxy-6-amino chitosan (+).
Phthaloyl deprotection conditions- NMP/$NH_2NH_2$

METHOD OF SYNTHESISING 6-DEOXY-6-AMINO-β-D-GLUCOPYRANOSIDE-CONTAINING POLYMERS AND THEIR PRECURSORS

CROSS REFERENCE TO RELATED APPLICATIONS

This application is a U.S. National Stage Application under 35 U.S.C. § 371 of International Application No. PCT/IB2018/059169, filed on Nov. 21, 2018, which claims the benefit of GB Patent Application No. 1719330.1, filed on Nov. 21, 2017, the entire disclosures of which are hereby incorporated by reference for any and all purposes.

FIELD OF THE INVENTION

This invention relates to an improved method of synthesising derivatives of β-D-glucopyranoside-containing polymers, particularly chitin, chitosan, cellulose, amylose, pullulan, curdlan, inulin, guar gum and cyclodextrin by introducing a nitrogen functionality at the 6-position to provide access to 6-deoxy-6-amino-β-D-glucopyranoside-containing polymers.

BACKGROUND TO THE INVENTION

Chitin, chitosan, cellulose, amylose, pullulan, curdlan, inulin, guar gum and cyclodextrin are renewable biopolymers with inherently favourable properties allowing diverse chemical modification that generates novel nanomaterials ideal for biomedical applications. Chitin and most β-D-glucopyranoside containing polymers have very poor aqueous solubility with limited utility as a result. For this reason, the use of modified versions of these polymers has increased exponentially in biomedical applications in recent years.

Chitosan (1b, Scheme 1) is a linear semi-crystalline polysaccharide which has recently received significant scientific interest owing to its unique properties, including its biocompatibility, chemical versatility, biodegradability and low toxicity. The material is widely available globally and comes in a variety of grades and sources. It is considered to be an environmentally friendly 'green' polymer which has been classified as a Generally Regarded As Safe (GRAS) material.

Due to the poor aqueous solubility of natural chitin and more so, chitosan, it is desirable to find water soluble derivatives. Numerous strategies have been proposed for the conjugation of polar groups to the 6-hydroxy and/or the 2-amino functional groups of chitosan. However, in order to retain the polymer's structural skeleton, substitution of the 6-hydroxy with a basic 6-amino group is desirable and imparts a water solubility to the chitosan polymer.

The known synthesis of 6-deoxy-6-amino chitosan (4b) illustrated in Scheme 1 involves converting the 6-hydroxy group into a substitutable halide with N-halosuccinimide, followed by substitution of the halide with sodium azide. The 6-deoxy-6-amino product is then obtained after Staudinger reduction of the azide with triphenylphosphine.

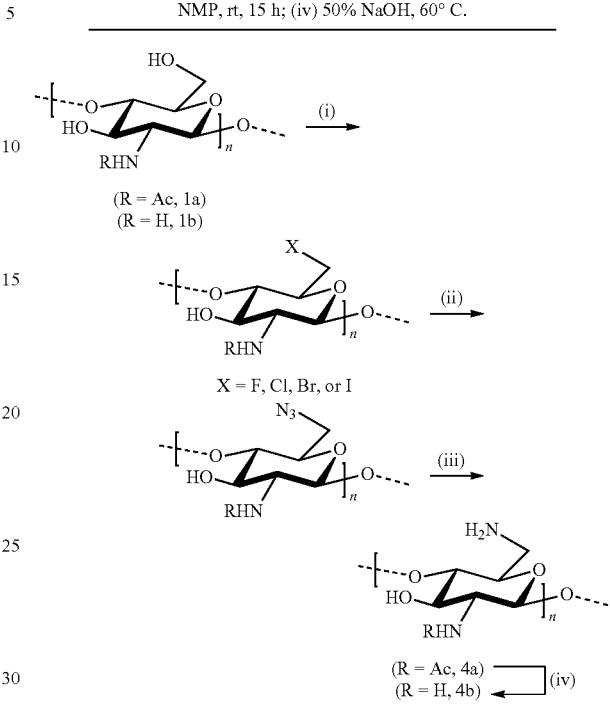

Scheme 1: Known synthesis of 6-deoxy-6-amino derivatives. (i) N-halosuccinimide, triphenylphosphine, NMP, 80° C., 2 h; (ii) NaN$_3$, NMP, 80° C., 4 h; (iii) triphenylphosphine, NMP, rt, 15 h; (iv) 50% NaOH, 60° C.

The synthesis of 6-deoxy-6-aminochitosan according to Scheme 1 suffers from several problems. Firstly, substitution of the 6-hydroxy group with N-halosuccinimide is not scalable and therefore unsuited to industrial conversion of natural polymers such as chitin and cellulose. Secondly, the triphenylphosphine oxide by-product of the Staudinger reaction is difficult to separate from the polymer product and results in persistent contamination of the product. Thirdly, triphenylphosphine oxide is toxic, which may render the synthesis of Scheme 1 unsuitable for preparing 6-deoxy-6-amino polymers for human consumption.

Other known synthetic routes involve derivatising the 6-hydroxyl group with toluene sulfonyl chloride and substituting the resulting tosylate with ammonia gas in a high pressure autoclave at 60° C. However, this process gives very low yields and is dangerous and unsuitable for use in a scaled up industrial setting. Other known synthetic pathways to the 6-deoxy-6-amino product involve the use of toxic solvents such as NMP and DMSO which are environmentally undesirable.

There is therefore room for an improved, scalable synthesis of 6-deoxy-6-amino polymers and their precursors that addresses the aforementioned problems at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of this invention, there is provided a method for synthesising a polymer of formula I

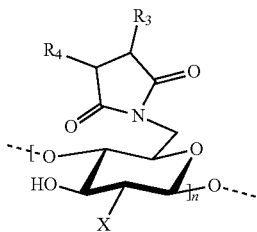

wherein:

X is —OH or —NR₁R₂;

R₁=R₂=H; or R₁=H and R₂=acyl; or N, R₁ and R₂ together form an optionally substituted cyclic imide;

R₃ and R₄ are each independently H, optionally substituted alkyl, optionally substituted alkenyl, optionally substituted haloalkyl, optionally substituted cycloalkyl, optionally substituted heterocyclyl, optionally substituted acyl, optionally substituted aryl, or optionally substituted heteroaryl; or R₃ and R₄ together with the atoms to which they are attached form an optionally substituted cycloalkyl, an optionally substituted aryl or an optionally substituted heteroaryl; and n is an integer from 10 to 3000;

the method comprising: reacting a polymer of formula III,

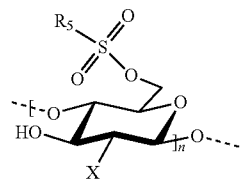

wherein R₅ is optionally substituted alkyl or optionally substituted aryl, with an optionally substituted cyclic imide anion to form the polymer of formula I

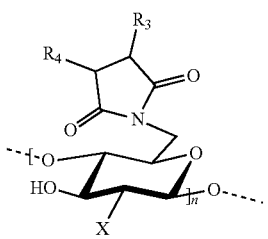

The method may further include quenching the reaction with an alcohol, which may be methanol or ethanol.

The method may further include reacting a polymer of formula II

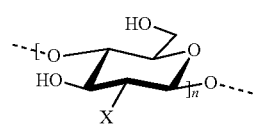

with a sulfonyl halide to form the polymer of formula III

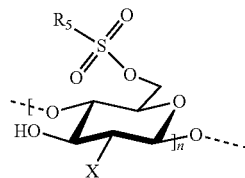

The reaction may be performed in any suitable aprotic polar solvent, preferably in dimethylacetamide (DMAc), the sulfonyl halide may be a methane sulfonyl halide, a p-cymene sulfonyl halide or a toluene sulfonyl halide, and the toluene sulfonyl halide may be o-toluenesulfonyl chloride, m-toluenesulfonyl chloride or p-toluenesulfonyl chloride.

The optionally substituted cyclic imide anion may be an optionally substituted succinimide anion or an optionally substituted phthalimide anion. The optionally substituted phthalimide anion may be 3,4,5,6-tetrachlorophthalimide.

The polymer of formula II may be reacted with from 3 to 10 molar equivalents of the sulfonyl halide based on the number of moles of monomer to form the polymer of formula III.

R₅ of formula III may be selected from methyl, p-toluene, o-toluene, m-toluene or p-cymene.

The method may further include quenching the reaction with an alcohol, which may be methanol or ethanol.

The polymer of formula I

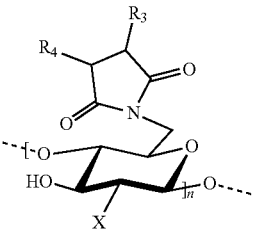

may be further reacted with hydrazine to form a polymer of formula IV

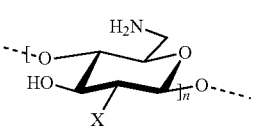

X in formula I may be optionally substituted cyclic imido and X in formula IV may be —NH₂ and the reaction may be performed in ethanol, N-methyl-2-pyrrolidone or water.

Alternatively, X may be optionally substituted cyclic imido in both formula I and formula IV, and the reaction may be performed in ethanol.

The cyclic imido may be succinimide, phthalimide or 3,4,5,6-tetrachlorophthalimide.

The polymer of formula IV in which X is —NHAcyl may be further reacted with a saponifying agent to form a polymer of formula V

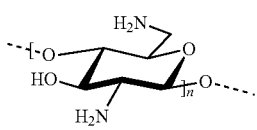

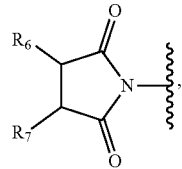

The acyl may be acetyl.

X may be —OH.

The method may include reacting cellulose, amylose, pullulan, curdlan, inulin, guar gum or cyclodextrin having the formula:

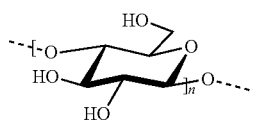

with a sulfonyl halide to form the polymer of formula III where X is —OH.

In accordance with a second aspect of this invention, there is provided a compound as synthesised by the method defined above.

BRIEF DESCRIPTION OF THE FIGURE

FIG. 1 is an image of various solutions treated with ninhydrin to confirm the presence of an amino group in the respective polymers. Purple is positive, indicating the presence of an amine, whereas a clear solution is negative and indicates the absence of an amine.

DETAILED DESCRIPTION OF THE INVENTION

Throughout the specification and claims unless the content requires otherwise the word 'comprise' or variations such as 'comprises' or 'comprising' will be understood to imply the inclusion of a stated integer or group of integers but not the exclusion of any other integer or group of integers.

"Acyl" means a radical of general formula —C(O)R, where R is an alkyl group, derived by the removal of one or more hydroxyl groups from an oxoacid. It contains a double bonded oxygen atom and an alkyl group. In organic chemistry, the acyl group (IUPAC name: alkanoyl) is usually derived from a carboxylic acid.

The term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. The permissible substituents can be one or more and the same or different for appropriate organic compounds. For purposes of this invention, heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

"Cyclic imide" and "cyclic imido" refer to the group of compounds having the general chemical structure where $R_6$ and $R_7$ are each independently H (in which case the cyclic imide is a succinimide), optionally substituted alkyl, optionally substituted alkenyl, optionally substituted haloalkyl, optionally substituted cycloalkyl, optionally substituted heterocyclyl, optionally substituted acyl, optionally substituted aryl, or optionally substituted heteroaryl, or $R_6$ and $R_7$ together with the atoms to which they are attached form an optionally substituted cycloalkyl, an optionally substituted aryl (e.g. a benzene ring, in which case the cyclic imide is a phthalimide, such as 3,4,5,6-tetrachlorophthalimide) or an optionally substituted heteroaryl.

"Phthalimido" and "phthaloyl" means a univalent radical derived from phthalimide by removing the imido hydrogen atom and represented by "PhthN-", "—NPhth" and the chemical structure

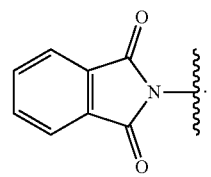 [SMILES: *N1C(=O)c2ccccc2C1=O]

The phthalimido may be optionally substituted at one or more positions of the benzene ring.

In the chemical structures of the polymers represented herein, exemplified by the general formula

the square brackets indicate a monomeric unit in the polymer chain, the dotted lines indicate bonds to atoms in adjacent monomers, and n is the number of repeating units in the polymer.

The invention provides a method of synthesising 6-deoxy-6-amino-β-D-glucopyranoside-containing polymers and their precursors, particularly from chitin, chitosan, cellulose, amylose, pullulan, curdlan, inulin, guar gum, cyclodextrin and related molecules. The synthesis provides access to polymers of enhanced solubility which are capable of being further derivatised at the newly introduced 6-amino position. The synthesis also provides a greener synthetic route to these compounds in fewer steps than existing methods.

The method includes synthesising a polymer of formula I

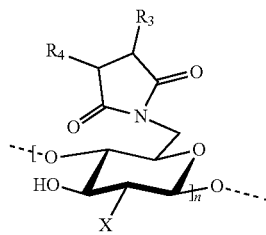

wherein:
X is —OH or —NR$_1$R$_2$;
R$_1$=R$_2$=H; or R$_1$=H and R$_2$=acyl; or N, R$_1$ and R$_2$ together form an optionally substituted cyclic imide;
R$_3$ and R$_4$ are each independently H, optionally substituted alkyl, optionally substituted alkenyl, optionally substituted haloalkyl, optionally substituted cycloalkyl, optionally substituted heterocyclyl, optionally substituted acyl, optionally substituted aryl, or optionally substituted heteroaryl; or R$_3$ and R$_4$ together with the atoms to which they are attached form an optionally substituted cycloalkyl, an optionally substituted aryl or an optionally substituted heteroaryl; and
n is an integer from 10 to 3000;
by reacting a polymer of formula III,

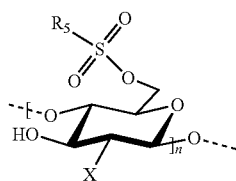

wherein R$_5$ is optionally substituted alkyl or optionally substituted aryl and X is as defined above for formula I, with an optionally substituted cyclic imide anion to form the polymer of formula I

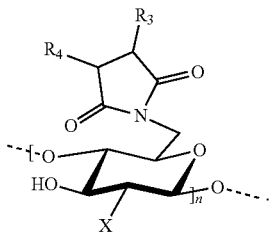

After completion of the reaction, water or an alcohol, such as methanol or ethanol, may be added to quench any unreacted reagents, such as unreacted cyclic imide anion. Alcohols are preferred as they result in the production of a cleaner polymer and can be easily removed from the quenched reaction mixture by distillation.

The R$_2$ acyl derivative can be selected from a C2-C6 acyl group, such as acetyl, propanoyl, butanoyl, pentanoyl, hexanoyl, isopropanoyl, isobutanoyl and tert-butanoyl.

R$_3$ and R$_4$ can each independently be selected from H or a C1 to C6, C1 to C8, C1 to C10 or C1 to C12 optionally substituted alkyl; a C2 to C6, C2 to C8, C2 to C10 or C2 to C12 optionally substituted alkenyl; a C1 to C6, C1 to C8, C1 to C10 or C1 to C12 optionally substituted haloalkyl; a C3 to C6, C3 to C8, C3 to C10 or C3 to C12 optionally substituted cycloalkyl; a C1 to C6, C1 to C8, C1 to C10 or C1 to C12 optionally substituted heterocyclyl; a C2 to C6, C2 to C8, C2 to C10 or C2 to C12 optionally substituted acyl; a C5 to C6, C5 to C8, C5 to O10 or C5 to C12 optionally substituted aryl; or a 01 to C6, C1 to C8, C1 to C10 or C1 to C12 optionally substituted heteroaryl.

R$_5$ can be selected from a C1 to C6, C1 to C8, C1 to C10 or C1 to C12 optionally substituted alkyl, or a C5 to C6, C5 to C8, C5 to C10 or C5 to C12 optionally substituted aryl. In some embodiments, R$_5$ can be selected from methyl, o-toluene, m-toluene, p-toluene and p-cymene, depending on the sulfonyl halide reagent used in the reaction.

"n" can be an integer from 10 to 3000, from 20 to 3000, from 30 to 3000, from 40 to 3000, from 50 to 3000, from 100 to 3000, from 10 to 1000, from 20 to 1000, from 30 to 1000, from 40 to 1000, from 50 to 1000, from 100 to 1000, from 10 to 500, from 50 to 500, from 100 to 500, from 10 to 200, from 50 to 200, from 100 to 200, from 10 to 100, or from 50 to 100.

The method can include reacting a polymer of formula II

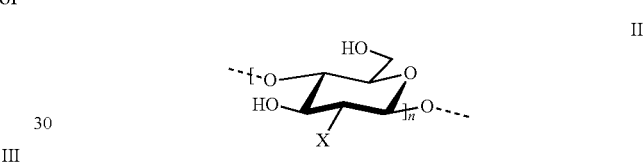

in which X is as defined above with respect to formula I, with a sulfonyl halide to form the polymer of formula III.

The sulfonyl halide can be a methane sulfonyl halide, a p-cymene sulfonyl halide or a toluene sulfonyl halide selected from o-toluene sulfonyl halide, m-toluene sulfonyl halide and p-toluene sulfonyl halide. The halide can be selected from fluoride, chloride, bromide and iodide. In some embodiments, the toluene sulfonyl halide may be p-toluenesulfonyl chloride.

The polymer of formula II can be reacted with from 3 to 10, 5 to 7, or 6 to 10, molar equivalents of the sulfonyl halide, based on the number of moles of monomer, to achieve the desired conversion to the polymer of formula III. In some embodiments, 6 molar equivalents of the sulfonyl halide can be used.

After completion of the sulfonylation reaction, water or an alcohol, such as methanol or ethanol, may be added to quench any unreacted reagents, such as unreacted sulfonyl halide. Alcohols are preferred as they result in the production of a cleaner polymer product and can easily be removed from the quenched reaction mixture by distillation.

The cyclic imide anion used in the reaction can be provided by any suitable cyclic imide anion, including a succinimide anion or a phthalimide anion. In a preferred embodiment, the cyclic imide anion is a phthalimide anion. The cyclic imide reagent used in the substitution reaction can be a salt selected from an alkali metal phthalimide (such as potassium phthalimide, sodium phthalimide or lithium phthalimide), an alkali metal succinimide (such as potassium succinimide, sodium succinimide or lithium succinimide), a transition metal phthalimide or succinimide, or an alkaline earth metal phthalimide or succinimide. In some embodiments, the phthalimide donor is potassium phthalimide. Substitution of the 6-sulfonyl group with the cyclic imide can be carried out in a suitable aprotic polar solvent, such as dimethylsulfoxide (DMSO), dimethylacetamide (DMAc) or hexamethylphosphoramide (HMPT), at a temperature from about 30-200° C., about 50-150° C., about 100-140° C., or preferably at about 120° C.

The polymer of formula I can be further reacted with hydrazine to form a 6-deoxy-6-amino-β-D-glucopyranoside polymer, such as 6-deoxy-6-amino cellulose, 6-deoxy-6-amino amylose, 6-deoxy-6-amino pullulan, 6-deoxy-6-amino curdlan, 6-deoxy-6-amino inulin, 6-deoxy-6-amino guar gum or 6-deoxy-6-amino cyclodextrin, which can be represented by formula IV

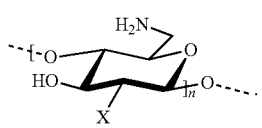

IV

In some embodiments in which X in formula I is optionally substituted cyclic imide, the reaction with hydrazine may be unselective and may remove both cyclic imide groups so that X in formula IV is —NH$_2$. This reaction can be performed in ethanol, N-methyl-2-pyrrolidone or water and provides the derivative, 6-deoxy-6-amino chitosan, represented by formula V

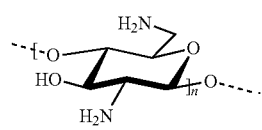

V

In other embodiments in which X in formula I is optionally substituted cyclic imide, the reaction with hydrazine may be selective for the 6-imido in the presence of the 2-imido so that X in both formula I and formula IV is cyclic imido. This selective 6-imido deprotection can be performed in ethanol under reflux.

In a specific embodiment in which X in formula I is —NR$_1$R$_2$ and R$_1$=H and R$_2$=acetyl, the reaction with hydrazine can provide 6-deoxy-6-amino chitin, which is represented by formula VI

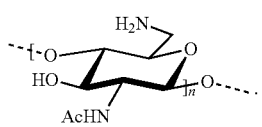

VI

In further embodiments, the polymer of formula IV in which X is —NR$_1$R$_2$ and R$_1$=H and R$_2$=acyl, can be further reacted with a saponifying agent to form the polymer of formula V

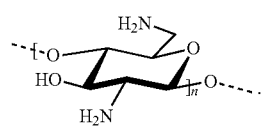

V

In some embodiments, X can be —OH in the polymer of formula III and in the polymer of formula I. In these embodiments, the method can include a preliminary step of reacting cellulose, amylose, pullulan, curdlan, inulin, guar gum or cyclodextrin, as represented by the formula:

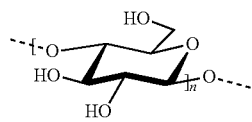

with a sulfonyl halide to form the polymer of formula III where X=—OH.

The invention extends to a polymer synthesised by the method defined above.

The method of the present invention overcomes several problems associated with conventional methods of synthesising 6-amino derivatives of chitosan, chitin, cellulose, amylose, pullulan, curdlan, inulin, guar gum and cyclodextrin. These conventional methods are usually based on the use of an azide to substitute a 6-halo or 6-tosyl followed by reduction of the azide to the required amine, usually by Staudinger reduction. Problems with this approach include incomplete substitution of the tosyl group with the azide and difficulty in separating from the polymer product the triphenylphosphine oxide by-product produced in Staudinger reaction. The present invention overcomes these issues by avoiding the use of an azide. Furthermore, the danger associated with substituting a tosylate with ammonia under high pressure, as used in other known synthetic pathways, is also avoided. The present method provides an improvement in C-6 amino introduction by using a cyclic imide anion substitution of the 6-O-sulfonyl group to give the 6-deoxy-6-imido derivative, which can be deprotected to the desired 6-amino product with hydrazine.

The invention further provides for selective deprotection of a 6-imido substituent in the presence of a 2-imido group. This was demonstrated using a model monomer, methyl 2,6-dideoxy-2,6-diamino-β-D-glucopyranoside, which was converted to the methyl 2,6-dideoxy-2-phthalimido-6-amino-β-D-glucopyranoside by hydrazine in ethanol. Likewise, the stepwise deprotection of 6-deoxy-2,6-bis-phthalimido chitosan (7b) was demonstrated. The latter orthogonal selective deprotection is useful for selective conjugation of functionality to the diamino polymer at the 2- and 6-positions.

The invention will now be described with reference to the following non-limiting examples.

In the examples and throughout the specification, polymers which include the suffix "a" refer to chitin derivatives, polymers which include the suffix "b" refer to chitosan derivatives, and polymers which include the suffix "c" refer to cellulose, amylose, pullulan, curdlan, inulin, guar gum or cyclodextrin derivatives.

Example 1: Synthesis of 2,6-diamino-2,6-dideoxy Chitosan from Chitin

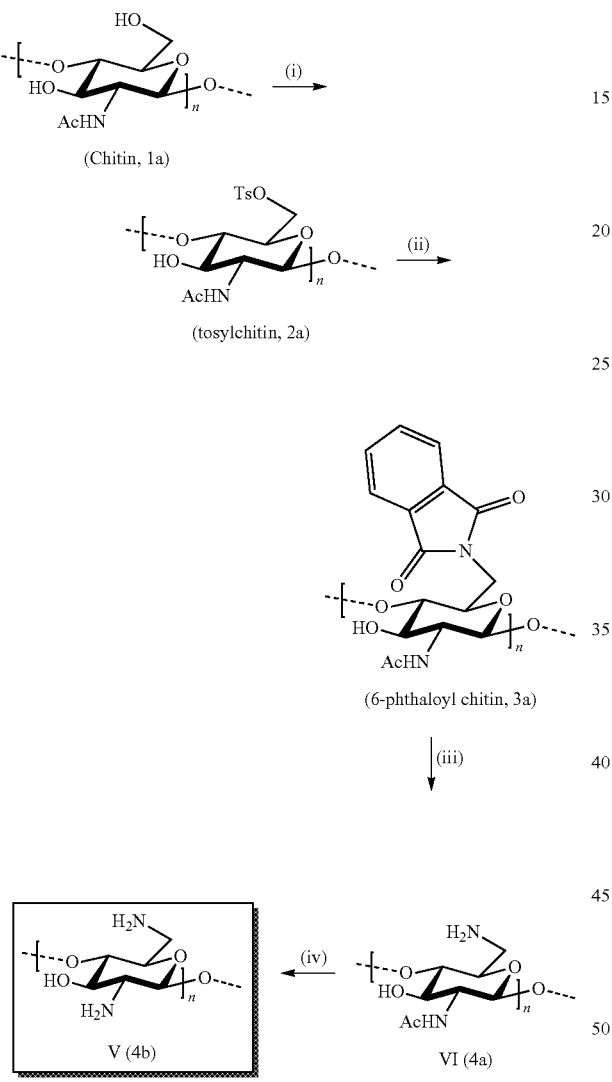

Scheme 2: Synthesis of 2,6-diamino-2,6-dideoxy chitosan from chitin. (i) TsCl, LiCl, Et$_3$N, DMAc 24 h - 48 h; (ii) Potassium phthalimide, DMAc at 120° C.; or potassium phthalimide, DMSO, 80° C., 12 h; (iii) EtOH at 95° C., 4.5 h; or H$_2$NNH$_2$·H$_2$O, NMP, 100° C., 4 hr; (iv) 50% NaOH, 60° C.

A synthesis starting with chitin (1a) was considered (Scheme 2). This route eliminates a phthaloylation step at the 2-position since the 2-amino is naturally protected by an acetyl group. A combination of DMAc/LiCl/Et$_3$N in the presence of p-toluenesulfonyl chloride gave the 6-deoxy-6-tosyl chitin (2a). A S$_N$2 substitution of the 6-tosyl group with a phthalimide anion was achieved using potassium phthalimide. Deprotection of the resulting N-phthaloyl protecting group at the C-6 position using hydrazine hydrate in either ethanol, NMP or DMF as solvent provided the 6-deoxy-6-amino chitin (VI or 4a). Saponification of the 2-acetamido group of VI with 50% aqueous sodium hydroxide at 60° C. produced 6-deoxy-6-amino chitosan (V or 4b).

Example 2: Synthesis of 6-deoxy-6-amino Chitosan from Chitin

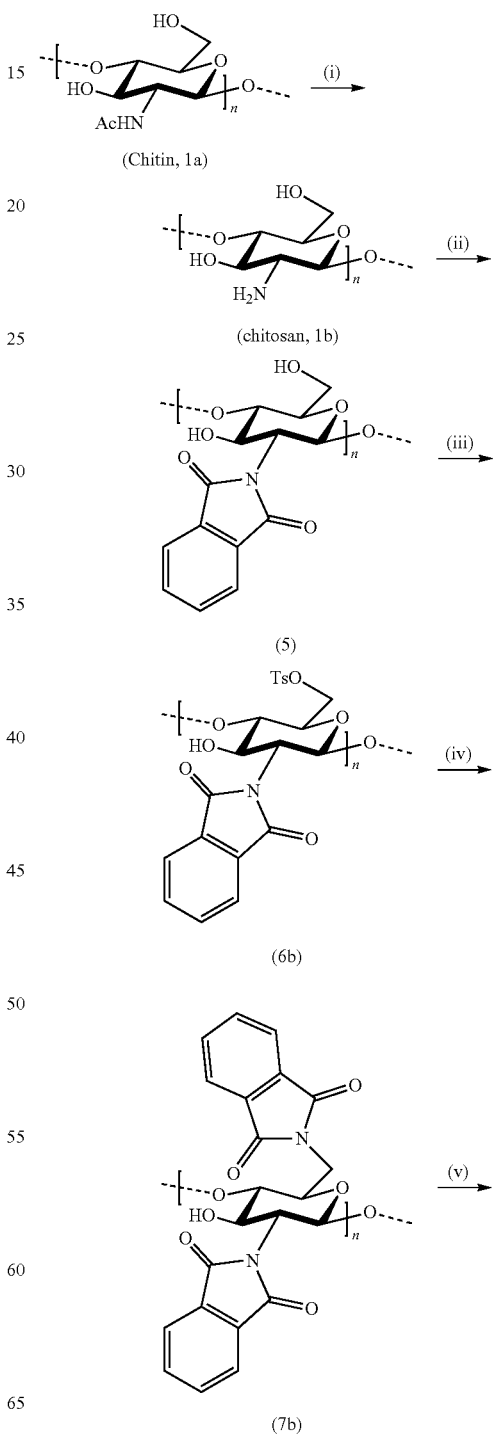

Scheme 3: Synthesis of 2,6-diamino-2,6-dideoxy chitosan from chitin. (i) 50% NaOH, 60° C.; (ii) phthalic anhydride, 10% AcOH/H$_2$O, reflux 120° C., 24 hr; (iii) TsCl, LiCl, Et$_3$N, DMAc 24 h; or TsCl, pyr, 17 h; (iv) Potassium Phthalimide, DMAc (or HMPT), 120° C., 4.5 h; or potassium phthalimide, DMSO, 80° C., 12 h; (v) EtOH/NH$_2$NH$_2$; (vi) NMP/NH$_2$NH$_2$.

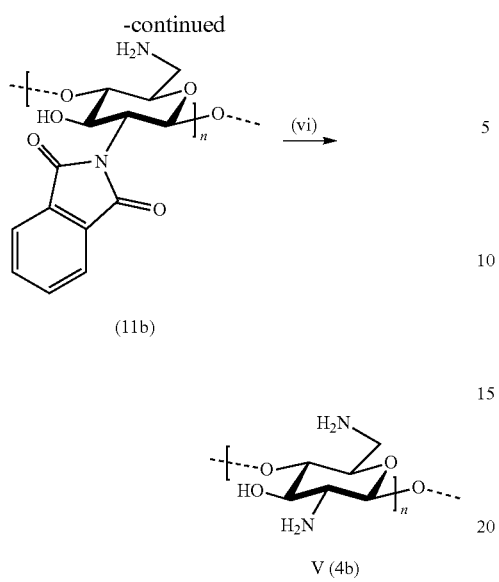

(11b)

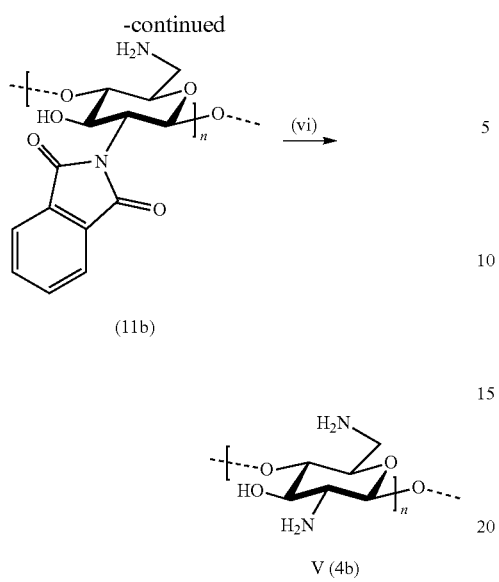

V (4b)

As illustrated in Scheme 3, chitosan was prepared from chitin by saponification of the 2-acetamido group with 50% aqueous sodium hydroxide at 60° C. The chitosan (1 b) was then reacted with phthalic anhydride in 10% aqueous acetic acid at 120° C. for 8 hours. The N-phthaloyl protecting group was preferred over other N-protecting groups as it provides chemoselective protection of the C-2 amino group. In addition, the phthaloyl protecting group is easily removed using hydrazine hydrate. Treatment of N-phthaloyl chitosan (5) with p-toluenesulfonyl chloride and triethylamine in dimethylacetamide (DMAc) for 24 h produced the 2-N-phthaloyl-6-O-tosyl chitosan (6b). Alternatively, the reaction can be performed using pyridine as solvent and base, although this approach is less environmentally benign and accordingly less preferred. The regioselective tosylation of the —OH group at C-6 of N-phthaloyl chitosan occurs due to the steric hindrance of the —OH group at C-3. The tosylation reaction required 6 molar (mol) equivalents of tosyl chloride (based on the sugar monomer) with overnight stirring to achieve a satisfactory degree of completion. With the 2-N-phthaloyl-6-deoxy-6-p-tosyl chitosan (6b) in hand, substitution of the 6-p-tosyl group with an amine to form 6-amino chitosan was considered. Instead of using N-methyl pyrrolidinone (NMP) as solvent, the greener DMAc solvent was used, leading to similar results. Alternatively, the reaction can be performed in DMSO, which allows for a higher reactant loading, results in a higher degree of conversion, and affords a cleaner product. A $S_N2$ substitution of the 6-tosyl group with a phthalimide anion was achieved using potassium phthalimide. Selective deprotection of the resulting N-phthaloyl protecting group at the C-6 position using hydrazine in ethanol provided the 2-phthaloyl-6-deoxy-6-amino chitosan (11b). Deprotection of both phthalimide groups to provide the 6-deoxy-6-diamino chitosan (V or 4b) was achieved using hydrazine in NMP.

Example 3: Synthesis of 6-deoxy-6-amino Cellulose

Scheme 4: Synthesis of 6-deoxy-6-amino cellulose. (i) TsCl, LiCl, Et$_3$N, DMAc 24 h; (ii) Potassium phthalimide, DMAc (or HMPT), 120° C., 4.5 h; or potassium phthalimide, DMSO, 80° C., 12 h; (iii) H$_2$NNH$_2$·H$_2$O, H$_2$O, 100° C., 4 hr.

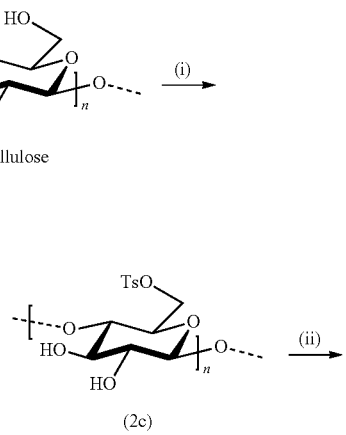

cellulose

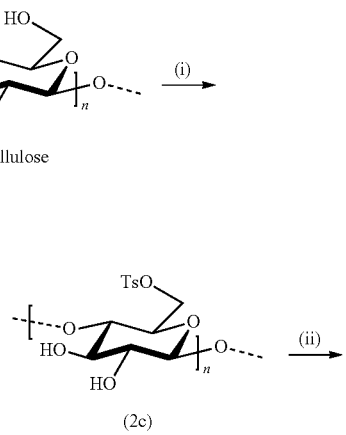

(2c)

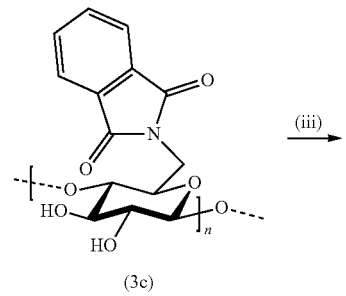

(3c)

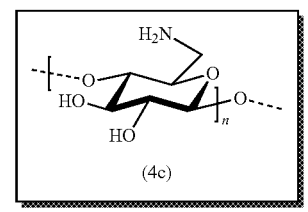

(4c)

As illustrated in Scheme 4, a synthesis of 6-deoxy-6-amino cellulose starts with cellulose. A combination of DMAc/LiCl/Et$_3$N in the presence of p-toluenesulfonyl chloride gave the 6-deoxy-6-tosyl cellulose (2c). A $S_N2$ substitution of the 6-tosyl group with a phthalimide anion was achieved using potassium phthalimide. Deprotection of the resulting N-phthaloyl protecting group at the C-6 position using hydrazine hydrate in either ethanol, NMP or DMF as solvent provided the 6-deoxy-6-amino cellulose (4c).

Example 4: Synthesis of Methyl 2,6-dideoxy-6-amino-β-D-glucopyranose

Scheme 5: Synthesis of methyl 2,6-dideoxy-6-amino-β-D-glucopyranose. (i) a) phthalic anhydride, 10% AcOH/H$_2$O, reflux 120° C., 8 hr; b) Acetic anhydride, pyridine, 18 h; c) HBr/AcOH, 90 min; d) MeOH, DCM, Lewis Acid (e.g. BF$_3$·OEt) e) Dowex® 1X2 (HCO$_3$⁻), MeoH; (ii) TsCl, pyr, 6 h; (iii) Potassium phthalimide, DMAc (or HMPT), 120° C., 4.5 h; or potassium phthalimide, DMSO, 80° C., 12 h; (iv) EtOH/NH$_2$NH$_2$; (v) DMF/NH$_2$NH$_2$;

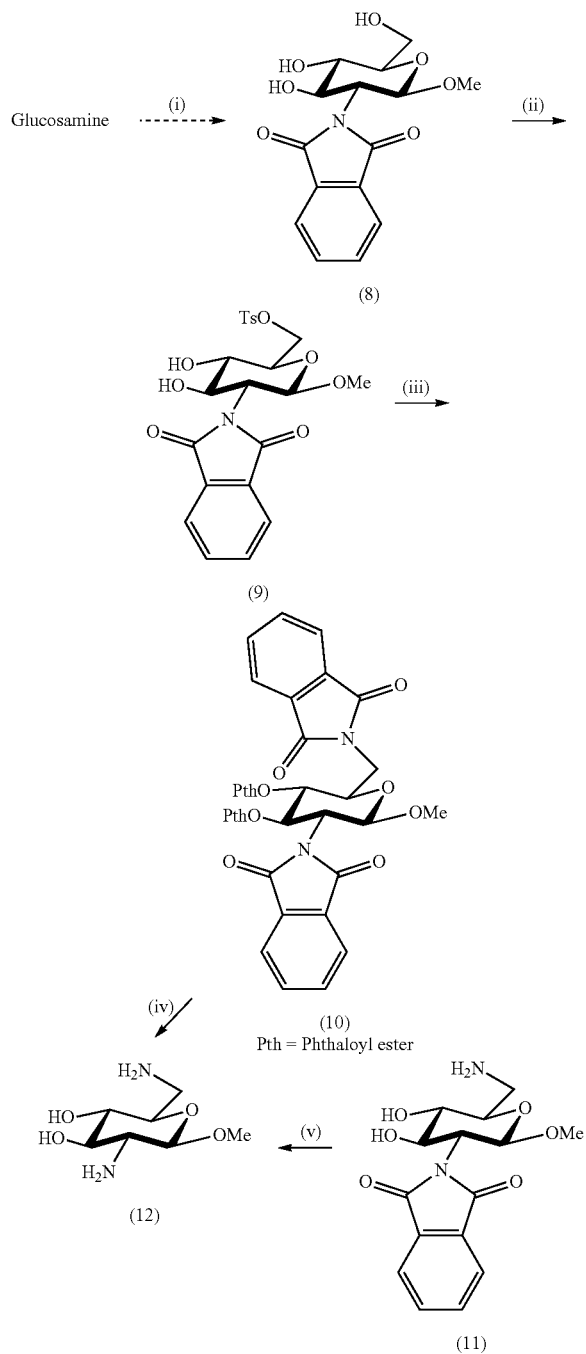

As illustrated in Scheme 5, synthesis of methyl 2,6-dideoxy-6-amino-β-D-glucopyranose, a model compound for chitin, chitosan, cellulose, amylose, pullulan, curdlan, inulin, guar gum or cyclodextrin polymers, proceeded by phthaloylating the 2-amino group of methyl glucosamine to produce compound 8. This was treated with tosyl chloride according to the method defined above, which yielded the 2-phthaloyl-6-tosyl glucopyranose (9). The tosyl was substituted with a phthalimide anion to form the 3,4-bis-phthalate-2,6-bis-phthaloyl derivative (10). Selective deprotection of the 6-phthaloyl in the presence of the 2-phthaloyl using hydrazine hydrate in absolute ethanol under reflux (about 95° C.) gave the 2-phthaloyl-6-amino-glucopyranose 11 or alternatively, all phthaloyl groups of 10 could be removed with hydrazine in dimethylformamide (DMF) at 100° C. to produce methyl 2,6-dideoxy-6-amino-β-D-glucopyranose (12).

All reagents and solvents used were purchased from commercial suppliers (Sigma-Aldrich, Fluka, Merck, Kimix, AK Scientific) and used as received. Distilled/Milli-Q® H$_2$O (conductance 18 MO cm, pH 7) and low molecular weight (LMVV) chitosan was used in all reactions, unless otherwise stated. All calculations were based on one unit of chitosan with a 90% degree of deacetylation (SigmaAldrich). Nuclear Magnetic Resonance (NMR) spectra were recorded on a Varian® Unity XR400 MHz ($^1$H at 399.95 MHz, $^{13}$C at 100.58 MHz, Varian® Unity XR300 MHz ($^1$H at 300.08 MHz, $^{13}$C at 75.46 MHz) or a Bruker® Ultrashield 400 Plus spectrometer ($^1$H at 400.20 MHz, $^{13}$C at 100.60 MHz). $^1$H and $^{13}$C NMR chemical shifts were reported using tetramethylsilane (TMS) as the internal standard. Infrared absorptions were measured on a Perkin-Elmer® Spectrum 100 FT-IR Spectrometer using Attenuated Total Reflectance (ATR).

Synthesis of 6-deoxy 6-p-toluenesulfonyl Chitin (2a)

Chitin (5.97 g, 29.4 mmol) and LiCl (26.1 g, 616 mmol) were dried separately at 50° C. overnight and at 130° C. for 4 hr. The solids were allowed to cool to 25° C., LiCl was allowed to stir in DMAc (260 mL) until all the solid had dissolved. Chitin was subsequently added and the mixture was allowed to stir at room temperature until a viscous gel formed (12 hr). The reaction mixture was allowed to cool to 0° C. followed by the addition of Et$_3$N (72 mL, 520 mmol) and a solution of p-toluenesulfonyl chloride (51.1 g, 268 mmol) in DMAc (120 mL) which was added over 90 min (13.5 mL in 10 minute intervals). The reaction was allowed to stir at 5° C. for a further 48 hr. Water (1.50 L) was added, the precipitate washed with ethanol (700 mL), and the resulting product lyophilised to give 6-deoxy 6-p-toluenesulfonyl chitin (2a) as a light brown solid (10.4 g, 99%). The reaction could also be quenched with ethanol. This is a preferred quenching reagent since it results in a cleaner, purer polymer and permits the ethanol to be easily recovered by distillation. IR: ν (cm⁻¹) 3396 (broad band, OH), 2936 (sharp band, C—H aliphatic), 1655 (sharp band, C=O stretch of secondary amide), 1160 (sharp band, S=O), 1063 (broad band, pyranose), 812 (sharp band, C—O—S); Elemental analysis (%): C, 44.70; H, 6.85; N, 5.30; S, 5.75; Ninhydrin test: negative vs blank.

Synthesis of 6-deoxy-6-phthalimido Chitin (3b)

Method 1: 6-Deoxy 6-p-toluenesulfonyl chitin (2.2761 g, 6.37 mmol) was suspended in DMAc (44 mL; 5% loading) together with potassium phthalimide (1.0615 g, 5.73 mmol). The mixture was refluxed at 120° C. for ~4.5 hours. The mixture was cooled and water was added. The resulting precipitate was filtered and washed with diethyl ether and water followed by drying under suction to obtain the polymer as a light brown powder (1.6716 g, 79%).

Method 2: 6-Deoxy 6-p-toluenesulfonyl chitin was suspended in DMSO (20% loading) together with potassium phthalimide. The mixture was heated at 80° C. for ~12 hours. The mixture was cooled and ethanol added to quench the reaction. The resulting precipitate was filtered and washed with diethyl ether and water followed by drying under suction to obtain the polymer as a light brown powder (complete conversion, approximately 80% recovery).

Solid-state $^{13}$C CPMAS NMR (5 kHz) δ 210.58 (amide C=O), 170.58 (C7 & C14), 131.01 (C8-C13), 98.48 (C1), 73.01 (C3-C5), 57.01 (C2), 21.14 (CH$_3$); IR (ATR): v (cm$^{-1}$) 3365 (broad band, OH), 2880 (sharp band, CH aliphatic), 1774 & 1702 (sharp band, imide C=O), 1387 (sharp band, C—N), 1062-1015 (broad band, pyranose), 721 (sharp band, phthaloyl-aromatic); Elemental Analysis (%): C, 49.67; H, 5.52; N, 7.19. Ninhydrin test: negative.

Synthesis of 6-deoxy-6-amino Chitin (4a)

6-Deoxy-6-phthalimido chitin (3a) (5.13 g, 15.5 mmol) and hydrazine monohydrate (18 mL, 372 mmol) were refluxed in absolute ethanol (120 mL) at 95° C. for 4 hr. The mixture was allowed to cool to 25° C. and EtOH (300 mL) was added. The resulting precipitate was collected by filtration. The polymer was obtained as a dark brown solid (3.10 g, 99%). IR: v (cm$^{-1}$) 3305 (broad strong band, OH, NH), 2876 (sharp band, CH aliphatic), 1647, 1585 (sharp, strong bands, NH$_2$ and N-acetyl), 1062 (broad band, pyranose); Elemental Analysis (%): C, 46.69; H, 6.69; N, 8.22; Ninhydrin test: positive vs the blank.

Synthesis of N-phthaloyl Chitosan (5)

Chitosan (1.18 g, 7.37 mmol) was refluxed with phthalic anhydride (2.75 g, 18.6 mmol) in 50 mL of a 10% AcOH/H$_2$O solution at 120° C. for 24 h. The mixture was cooled to room temperature, and the precipitate collected by centrifugation and filtration. The solid was washed with deionized water and ethanol and thereafter stirred in acetone to remove any unreacted phthalic anhydride. The polymer was recovered as a tan solid (1.71 g, 81%). $^1$H NMR (300 MHz, DMSO) δ 7.49-8.04 (phth), 4.05-5.31 (H-1, H-3-H-6), 3.32 (1H, s, H-2), 2.10 (s, acetylated units); 13C NMR (75 MHz, D$_2$O) δ 170.68 (amide C=O), 96.88 (C1), 76.07 (C5), 74.32 (C4), 69.60 (C3), 69.07 (C1'), 59.63 (C6), 55.43 (C2 & C3'); IR: v (cm$^{-1}$) 3409 (broad strong band, OH), 2926 (sharp band, CH aliphatic), 1775 and 1704 (phthalimido), 1632, 1520 & 1320 (strong bands, NH), and 1092 (broad band, pyranose), 715 (phthaloyl aromatic); Elemental Analysis (%): C, 53.16; H, 4.99; N, 3.57. Ninhydrin test: negative vs blank.

Synthesis of 6-deoxy 6-p-toluenesulfonyl N-Phthaloyl Chitosan (6b)

N-phthaloyl chitosan (5.78 g, 19.8 mmol) was suspended in pyridine (120 mL) and cooled to 0° C., followed by the addition of p-toluenesulfonyl chloride (40.5 g, 212 mmol). The mixture was allowed to stir for 17 hr at RT. The red/brown viscous solution was added to ice water (400 mL) and the resulting precipitate was filtered and washed with copious amounts (~500 mL) of ethanol and diethyl ether followed by drying under suction and vacuum to constant mass to obtain the polymer as a light brown powder (8.63 g, 97%). IR: v (cm$^{-1}$) 3448 (broad band, OH), 2948 (sharp band, CH aliphatic), 1774 & 1716 (sharp band, imide C=O), 1174 (sharp band, S=O), 1069-1006 (broad band, pyranose), 815 (sharp band, C—O—S) and 718 (sharp band, phthaloyl-aromatic); Elemental Analysis (%): C, 53.75; H, 4.50; N, 2.76. Ninhydrin test: negative vs blank.

Synthesis of 6-deoxy-2,6-bis(phthalimido) Chitosan (7b)

6-Deoxy 6-p-toluenesulfonyl N-phthaloyl chitosan (0.1248 g, 0.28 mmol) was suspended in DMAc (4 mL) (or HMPT) together with potassium phthalimide (0.0595 g, 0.32 mmol). The mixture was refluxed at 120° C. for ~4.5 hours. The mixture was cooled and water was added. The resulting precipitate was filtered and washed with diethyl ether and water followed by drying under suction to obtain the polymer as a light brown powder (0.0984 g, 84%). IR (ATR): v (cm$^{-1}$) 3412 (broad band, OH), 2892 (sharp band, CH aliphatic), 1774 & 1708 (sharp band, imide C=O), 1383 (sharp band, C—N), 1062-975 (broad band, pyranose), 719 (sharp band, phthaloyl-aromatic); Elemental Analysis (%): C, 52.99; H, 5.22; N, 6.02. (insoluble polymer). Ninhydrin test: negative vs blank.

Synthesis of Methyl 2,6-dideoxy-2,6-diamino-β-D-glucopyranose (12)

Synthesis of 2-Deoxy-2-phthalimido-α,β-D-glucopyranoside

NaHCO$_3$ (4.28 g, 50.9 mmol) was added slowly to a solution of D-glucosamine hydrochloride (5.41 g, 25.1 mmol) and phthalic anhydride (3.76 g, 25.4 mmol) in water (12.5 mL). The solution was allowed to stir for 18 hr at 25° C. The pH of the solution was thereafter adjusted to pH 2 using 5% HCl, resulting in a white precipitate that was collected and washed with water to produce 2-deoxy-2-phthalimido-α,β-D-glucopyranoside as a white solid (3.52 g, 45%).

$^1$H NMR (400 MHz, DMSO-d$_6$) δ 7.96 (1H, d, J=8.1 Hz, Ar—H), 7.77-7.72 (1H, m, Ar—H), 7.58-7.53 (2H, m, Ar—H), 6.34 (1H, br s, H-1), 5.08 (1H, br s, OH), 4.91 (1H, br s, OH), 4.46 (2H, br s, 2×OH), 3.82-3.48 (5H, m, H-3-H-6), 3.25-3.15 (1H, m, H-2); $^{13}$C NMR (101 MHz, DMSO) δ 169.0 (C=O), 168.73 (C=O), 131.5 (Ar-q), 131.4 (Ar-q), 129.7 (Ar—C), 129.4 (Ar—C), 129.2 (Ar—C), 128.5 (Ar—C), 91.1 (C-1), 72.6 (C-3), 71.4 (C-4), 71.01 (C-2), 61.67 (C-5), 55.54 (C-6); IR: v (cm$^{-1}$) 3253 (broad band, OH), 2877 (sharp peak, CH aliphatic), 1708 (sharp peak, imide C=O), 1615 (sharp peak, NH bending), 1557 (sharp band, C=O stretch of secondary amide) 1108 (sharp band, pyranose), 1037 (C—N vibration), 706 (sharp peak, phthaloyl-aromatic); Mp: 191-193° C. (Lit. Mp. 197-198° C., McGeary et al. J. Org. Chem. 2001, 66, 5102-5105)

Synthesis of 2-Deoxy-2-phthalimido-α,β-D-glucopyranoside Tetraacetate

Acetic anhydride was added to a solution of 2-deoxy-2-phthalimido-α,β-D-glucopyranoside (5.03 g, 16.3 mmol) in pyridine (21 mL) and allowed to stir for 18 hr at 25° C. The resulting solution was added to ice to allow precipitation of the product. The solid collected was allowed to stir in diethyl ether (30 mL) for 1 hr at 25° C. Thereafter, the solvent was removed followed by drying in vacuo. The residue was allowed to stir in ethanol (20 mL) and the solid was filtered and dried to yield 2-deoxy-2-phthalimido-α,β-D-glucopyranoside tetraacetate (6.66 g, 86%). A white solid was obtained as mixture of α:β isomers. α:β Isomers: 1:0.4; $^1$H NMR (400 MHz, CDCl$_3$) α-isomer: δ 7.87-7.77 (4H, m, Ar—H), 6.55 (1H, m, H-3), 6.27 (1H, d, J=3.3 Hz, H-1), 5.15 (1H, t, J=9.6, H-4), 4.71 (1H, dd, J=11.6, 3.4 Hz, H-2), 4.34 (1H, m, H-6), 4.14 (2H, m, H-5, H-6'), 2.13 (3H, s, OAc-Hd), 2.10 (3H, s, OAc-Hc), 2.08 (3H, s, OAc-Hb), 1.89 (3H, s, OAc-Ha); β-isomer: δ 7.87-7.77 (4H, m, Ar—H), 6.50 (1H, d, J=8.9 Hz, H-3), 5.87 (1H, dd, J=10.6, 9.2 Hz, H-1), 5.20 (1H, t, J=9.3, H-4), 4.46 (1H, dd, J=10.6, 8.9 Hz, H-2), 4.35 (1H, dd, J=12.1, 3.9, H-6), 4.29 (1H, m, H-6'), 4.19-4.14 (1H, m, H-5), 2.13 (3H, s, OAc-Hd), 2.10 (3H, s, OAc-Hc), 2.08 (3H, s, OAc-Hb), 1.89 (3H, s, OAc-Ha); $^{13}$C NMR (101 MHz, CDCl$_3$) δ 170.7 (C=O), 169.8 (C=O), 169.5 (C=O), 169.3 (C=O), 168.6 (C=O), 167.4 (C=O), 137.8 (Ar-q), 134.5 (Ar-q), 131.6 (Ar—C), 131.2 (Ar—C), 124.4 (Ar—C), 123.7 (Ar—C), 90.6 (C-1), 70.2 (C-5), 69.5 (C-4), 67.1 (C-6), 61.6 (C-3), 52.9 (C-2), 20.9 (C—OAc), 20.7 (C—OAc), 20.6 (C—OAc), 20.3 (C—OAc); IR: ν (cm$^{-1}$) 1748 (C=O), 1712 (sharp peak, imide C=O), 1469 (NH bending frequencies), 1365, 1213 (C—N bending), 1031 (C—N vibration), 723 (sharp peak, phthaloyl-aromatic); Mp: 100-101° C. (Lit. Mp: 105-110° C., McGeary et al. J. Org. Chem. 2001, 66, 5102-5105)

Synthesis of Methyl
2-deoxy-2-phthalimido-β-D-glucopyranoside (8)

2-deoxy-2-phthalimido-α,β-D-glucopyranoside tetraacetate (3.06 g, 6.40 mmol) was added to a solution of HBr in acetic acid (33%, 12 mL) followed by the addition of acetic anhydride (1 mL) and the mixture was allowed to stir for 90 minutes at 25° C. The reaction mixture was extracted with DCM (120 mL) and the organic layer washed with ice-water (120 mL×3), saturated NaHCO$_3$ (120 mL×2) and brine (60 mL). The organic layer was isolated and dried over anhydrous MgSO$_4$ followed by evaporating to give the bromo substituted sugar as a brown residue. The residue was subsequently dissolved in MeOH and left to stand overnight. The solution was neutralised with a Dowex® 1×2 HCO$_3^-$ ion exchange resin, and the filtrate removed in vacuo and washed with chloroform. The solvent was removed in vacuo and methyl 2-deoxy-2-phthalimido-β-D-glucopyranoside (8) was isolated as an off-white solid (1.48 g, 71%).

$^1$H NMR (400 MHz, CD$_3$OD-d$_4$) δ 7.99-7.85 (4H, m, Ar—H), 5.16 (1H, d, J=8.5 Hz, H-1), 4.30 (1H, dd, J=10.7, 8.4 Hz, H-3), 4.07-3.98 (2H, m, H-2, H-6), 3.82 (1H, dd, J=11.9, 5.2 Hz, H-6), 3.52-3.46 (5H, m, OMe, H-4, H-5); $^{13}$C NMR (101 MHz, CD$_3$OD) δ 168.4 (C=O), 134.3 (Ar-q), 134.1 (Ar-q), 131.7 (Ar—C), 122.8 (Ar—C), 99.3 (C-1), 76.9 (C-5), 71.3 (C-3, C-4), 61.4 (C-6), 57.1 (C-2), 55.62 (OMe); IR: ν (cm$^{-1}$) 3313 (broad band, OH), 2940 (sharp peak, CH aliphatic), 1704 (sharp peak, imide C=O), 1563 (sharp band, C=O stretch of secondary amide), 1385 (C—H bending, C—CH$_3$ deformation), 1066 (sharp band, pyranose), 1018 (C—N vibration), 711 (sharp peak, phthaloyl-aromatic); Mp: 190-191° C. (Lit. Mp: 190° C., McGeary et al. J. Org. Chem. 2001, 66, 5102-5105)

Synthesis of Methyl 2-deoxy-2-phthalimido-6-O-p-toluenesulfonyl-β-D-glucopyranoside (9)

p-Toluenesulfonyl chloride (4.30 g, 22.5 mmol) was added to a solution of methyl 2-deoxy-2-phthalimido-β-D-glucopyranoside (8) (2.62 g, 8.1 mmol) in anhydrous pyridine (165 mL) at −60° C. The reaction mixture was allowed to stir at −60° C. for 6 hr, after which time the mixture was poured into conc. HCl-ice (1:1) and extracted with CHCl$_3$ (100 mL×3). The organic layer was successively washed with conc. HCl-ice (1:2), ice-water followed by saturated NaHCO$_3$. The organic layer was separated and dried over anhydrous MgSO$_4$ followed by removal of the solvent in vacuo to give an off-white solid methyl 2-deoxy-2-phthalimido-6-O-p-toluenesulfonyl-β-D-glucopyranoside (9) (3.09 g, 80%).

$^1$H NMR (400 MHz, CDCl$_3$) δ 7.84-7.77 (4H, m, Ar—H), 7.74-7.69 (2H, d, J=8.0 Hz Ar—H), 7.36 (2H, d, J=8.0 Hz, Ar—H), 5.11 (1H, d, J=8.4 Hz, H-1), 4.44-4.36 (2H, m, H-3, H-6), 4.29 (1H, dd, J=10.6, 8.3 Hz, H-6), 4.05 (1H, dd, J=10.9, 8.4, H-2), 3.67-3.59 (1H, m, H-5), 3.60-3.52 (1H, m, H-4), 3.38 (3H, s, OMe), 2.47 (3H, s, CH$_3$); $^{13}$C NMR (101 MHz, CDCl$_3$) δ 168.32 (2×C=O), 145.1 (Ar-q), 134.1 (Ar—C), 132.8 (Ar-q), 131.7 (2×Ar-q), 129.90 (2×Ar—C), 128.0 (2×Ar—C), 123.5 (2×Ar—C), 99.2 (C-1), 73.5 (C-5), 71.6 (C-3), 71.4 (C-4), 68.6 (C-6), 56.7 (C-2), 56.2 (OMe), 21.6 (CH$_3$); IR: ν (cm$^{-1}$) 3472 (broad band, OH), 2912 (sharp band, CH aliphatic), 1774, 1698 (sharp band, imide C=O), 1173 (sharp band, S=O), 1082 (sharp band, pyranose), 812 (sharp band, C—O—S), 719 (sharp band, phthaloyl-aromatic); Mp: 152-155° C. (Lit. Mp: 97-100° C., racemic mixture, Kitahara et al. Biosci. Biotech. Biochem. 1993, 57, 1906-190)

Synthesis of Methyl 3,4-bis-phthalate-2,6-bis-phthalimido-β-D-glucopyranoside-β-D-glucopyranoside (10)

Potassium phthalimide (0.482 g, 2.60 mmol) was added to a solution of methyl 2-deoxy-2-phthalimido-6-O-p-toluenesulfonyl-β-D-glucopyranoside (9) (0.745 g, 1.56 mmol) in DMAc (21 mL) and heated at 110° C. until TLC analysis indicated the complete consumption of the starting material. After 4.5 hr, water (20 mL) was added, and the solution extracted with diethyl ether (30 mL×3). The combined organic layers were washed with water and dried over anhydrous MgSO$_4$. The solvent was removed in vacuo to produce an off-white solid, which was subsequently recrystallised from methanol to give methyl 3,4-bis-phthalate-2, 6-bis-phthalimido-β-D-glucopyranoside (10) as a white solid (0.574 g, 49%).

$^1$H NMR (400 MHz, CDCl$_3$) δ 7.70-7.93 (16H, m, Ar—H), 5.11 (1H, d, J=8.4 Hz, H-1), 4.42 (1H, dd, J=10.8, 8.8 Hz, H-3), 4.26 (1H, dd, J=14.6, 3.6 Hz, H-6), 4.09-4.04 (2H, m, H-2, H-6), 3.72 (1H, dt, J=9.8, 3.3 Hz, H-4), 3.41 (3H, s, OMe), 3.32-3.38 (1H, m, H-5); $^{13}$C NMR (101 MHz, CDCl$_3$) δ 169.1 (C=O), 168.2 (C=O), 167.8 (C=O), 134.3 (Ar-q), 134.0 (Ar-q), 132.6 (Ar—C), 131.8 (Ar—C), 123.7 (Ar—C), 123.4 (Ar—C), 99.0 (C-1), 73.8 (C-3), 72.8 (C-2), 70.3 (C-5), 56.3 (C-2), 56.1 (OMe), 37.8 (C-6); IR: ν (cm$^{-1}$) 3380 (broad band, OH), 2940 (sharp band, CH aliphatic), 1774, 1704 (sharp band, imide C=O), 1389 (sharp band, C—N), 1068 (sharp band, pyranose), 719 (sharp band, phthaloyl-aromatic); ESI-MS: m/z 475.1114 ([M−2(C$_8$H$_5$O$_3$+Na]$^+$); Mp: 120-124° C.

Phthaloyl Deprotection of Methyl 3,4-bis-phthalate-2,6-bis-phthalimido-β-D-glucopyranoside-β-D-glucopyranoside (10) to Give Methyl 2,6-dideoxy-6-amino-β-D-glucopyranose (12)

Methyl 3,4-bis-phthalate-2,6-bis-phthalimido-β-D-glucopyranoside (10), (0.1020 g, 0.23 mmol) was dissolved in DMF (4 mL) and hydrazine hydrate (2 mL, 40 mmol) was added. The solution was refluxed at 100° C. until TLC analysis indicated the completion of the reaction. The solution was reduced by co-evaporation and the residue obtained was further purified. Mono deprotected compound (11) was not isolated as the reaction was allowed to proceed to the target compound methyl 2,6-dideoxy-6-amino-β-D-glucopyranose (12), obtained as a white solid.

$^1$H NMR (300 MHz, D$_2$O) δ 5.07 (d, J=3.9 Hz, 1H, H-1), 3.86_3.90 (m, 2H, H-3, H-5), 3.22_3.51 (m, 6H, H-2, H-4, OCH$_3$, H-6a), 3.17 (dd, J=10.4 and 13.5 Hz, 1H, H-6b); $^{13}$C NMR (75 MHz, D2O) δ 96.91, 71.82, 70.11, 68.47, 56.19, 54.29, 40.88.

The invention claimed is:

1. A method for preparing a polymer of formula I

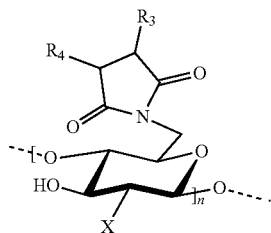

wherein:

X is —OH or —NR$_1$R$_2$;

R$_1$=R$_2$=H; or R$_1$=H and R$_2$=acyl; or N, R$_1$ and R$_2$ together form an optionally substituted cyclic imide;

R$_3$ and R$_4$ are each independently H, optionally substituted alkyl, optionally substituted alkenyl, optionally substituted haloalkyl, optionally substituted cycloalkyl, optionally substituted heterocyclyl, optionally substituted acyl, optionally substituted aryl, or optionally substituted heteroaryl; or R$_3$ and R$_4$ together with the atoms to which they are attached form an optionally substituted cycloalkyl, an optionally substituted aryl or an optionally substituted heteroaryl; and n is an integer from 10 to 3000;

the method comprising: reacting a polymer of formula III,

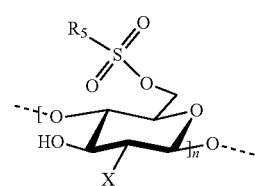

wherein R$_5$ is optionally substituted alkyl or optionally substituted aryl, with an optionally substituted cyclic imide anion to form the polymer of formula I:

2. The method of claim 1, including reacting a polymer of formula II:

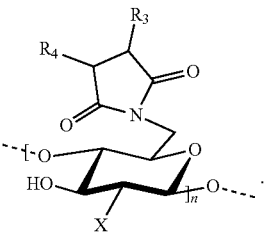

with a sulfonyl halide to form the polymer of formula III

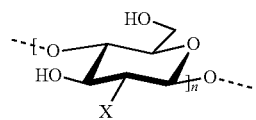

wherein R$_5$ is optionally substituted alkyl or optionally substituted aryl.

3. The method of claim 2, wherein the reaction with the sulfonyl halide is performed in DMAc.

4. The method of claim 2, wherein the sulfonyl halide is a methane sulfonyl halide, a p-cymene sulfonyl halide or a toluene sulfonyl halide.

5. The method of claim 2, wherein the polymer of formula II is reacted with from 3 to 10 molar equivalents of the sulfonyl halide based on the moles of monomer to form the polymer of formula III.

6. The method of claim 1, wherein the cyclic imide anion is a succinimide anion or a phthalimide anion.

7. The method of claim 1, wherein the polymer of formula I is further reacted with hydrazine to form a polymer of formula IV:

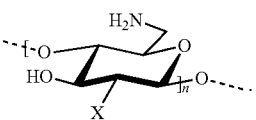

8. The method of claim 7, wherein X in formula I is optionally substituted cyclic imide and X in formula IV is —NH$_2$.

9. The method of claim 7, wherein the reaction with hydrazine is performed in ethanol, N-methyl-2-pyrrolidone or water.

10. The method of claim 7, wherein X is optionally substituted cyclic imide in both formula I and formula IV.

11. The method of claim 10, wherein the reaction with hydrazine is performed in ethanol.

12. The method of claim 7, further comprising reacting the polymer of formula IV in which X is —NHAcyl with a saponifying agent to form a polymer of formula V:

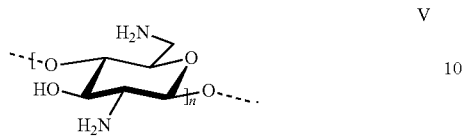

V

13. The method of claim 1, wherein X is OH.

14. The method of claim 1, comprising reacting cellulose, amylose, pullulan, guar gum or cyclodextrin having the formula:

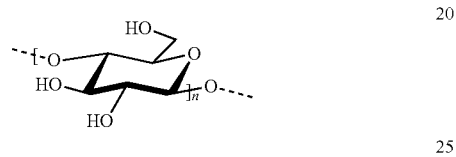

with a sulfonyl halide to form the polymer of formula III where X is —OH.

* * * * *